United States Patent
Le-Ngoc (10) Patent No.: US 10,084,516 B2
(45) Date of Patent: Sep. 25, 2018

(54) ANTENNA SUB-ARRAY BEAM MODULATION

(71) Applicant: Tho Le-Ngoc, Montreal (CA)

(72) Inventor: Tho Le-Ngoc, Montreal (CA)

(73) Assignee: HUAWEI TECHNOLOGIES CANADA CO., LTD., Kanata (CA)

( * ) Notice: Subject to any disclaimer, the term of this patent is extended or adjusted under 35 U.S.C. 154(b) by 0 days.

(21) Appl. No.: 15/151,576

(22) Filed: May 11, 2016

(65) Prior Publication Data
US 2017/0331532 A1   Nov. 16, 2017

(51) Int. Cl.
| | | |
|---|---|---|
| H04L 27/00 | (2006.01) | |
| H04B 7/0452 | (2017.01) | |
| H04B 7/06 | (2006.01) | |
| H01Q 21/29 | (2006.01) | |

(52) U.S. Cl.
CPC ......... *H04B 7/0452* (2013.01); *H01Q 21/29* (2013.01); *H04B 7/0613* (2013.01)

(58) Field of Classification Search
CPC .................................................. H04B 7/0452
USPC ........................................................ 375/299
See application file for complete search history.

(56) References Cited

U.S. PATENT DOCUMENTS

| | | |
|---|---|---|
| 5,905,466 A | 5/1999 | Jha et al. |
| 5,923,296 A | 7/1999 | Sanzgiri et al. |
| 6,259,321 B1 * | 7/2001 | Song ............... H03F 3/45188 330/254 |
| 7,684,776 B2 | 3/2010 | Nation |
| 8,625,694 B1 * | 1/2014 | Lee .................. H04L 27/3405 375/261 |
| 2006/0251156 A1 * | 11/2006 | Grant ................. H04B 1/7103 375/148 |
| 2011/0013713 A1 | 1/2011 | Li et al. |
| 2012/0171972 A1 * | 7/2012 | Huang ................ H01Q 1/246 455/90.2 |
| 2015/0333865 A1 | 11/2015 | Yu et al. |
| 2016/0044647 A1 * | 2/2016 | Ashrafi ................ H04J 14/06 370/330 |
| 2016/0301453 A1 * | 10/2016 | Sanderovich ....... H04B 7/0426 |

OTHER PUBLICATIONS

Tao Hong et al. "Dual-Beam Directional Modulation Techniquefor Physical-Layer Secure Communication", IEEE Antennas and Wireless Propagation Letters, vol. 10, 2011.

Rajab M. Legnain et al. "Improved Spatial Modulation for High Spectral Efficiency" International Journal of Distributed and Parallel Systems (IJDPS) vol. 3, No. 2, Mar. 2012.

(Continued)

*Primary Examiner* — Lihong Yu (57) ABSTRACT

Methods for transmitting over a wireless channel from a plurality of transmit chains are provided, as well as apparatuses for performing the methods. Each transmit chain has a variable gain power amplifier coupled to an antenna element. A subset of at least two transmit chains is selected from the plurality of transmit chains. A gain of at least one of the variable gain power amplifiers is set in accordance with the modulation scheme. Respective beams are transmitted with each transmit chain in the subset. Each respective beam represents a component of a modulated signal according to a modulation scheme, so that the beams combine over the wireless channel to form the modulated signal.

25 Claims, 6 Drawing Sheets

(56) References Cited

OTHER PUBLICATIONS

Yan Yan et al. "High-capacity millimetre-wave communications with orbital angular momentum multiplexing" Nature Communications | 5:4876 | DOI: 10.1038/ncomms5876 |www.nature.com/naturecommunications, Sep. 16, 2014.

Marco Di Renzo et al. "Spatial Modulation for Generalized MIMO: Challenges, Opportunities, and Implementation" Proceedings of the IEEE | vol. 102, No. 1, Jan. 2014.

Hong et al., "Dual-Beam Directional Modulation Technique for Physical-Layer Secure Communication", IEEE Antennas and Wireless Propagation Letters, Dec. 7, 2011, vol. 10, pp. 1417-1420.

Hafez et al., "On Directional Modulation: An Analysis of Transmission Scheme with Multiple Directions", IEEE International Conference on Communication Workshop, Jun. 2015.

* cited by examiner

⊘ selected antenna element
○ unselected antenna element

FIG. 4B ically to radio-frequency (RF) transmit chains, each transmit chain comprising a power amplifier coupled to one of the antenna elements. As the number of antenna elements grows, the signal processing performed by such a baseband processor increases in complexity.

ANTENNA SUB-ARRAY BEAM MODULATION

FIELD

The present application relates generally to wireless communication using antenna arrays, and in some aspects, to communication for multiple-input and multiple-output (MIMO) systems.

BACKGROUND

Some communication systems make use of multiple antenna elements at the transmitter and/or the receiver. For example, MIMO systems involve communication between a transmitter with multiple antenna elements and a receiver with multiple antenna elements. MIMO systems offer spatial multiplexing, diversity, and beamforming gains compared to systems with a single antenna element at the transmitter and the receiver.

In massive MIMO communication systems, base stations make use of arrays of antenna elements where the number of antenna elements is larger than a number of parallel streams being transmitted. For example, a base station in a multi-user (MU) massive MIMO system may have hundreds or even thousands of antenna elements simultaneously serving tens of users on a same time-frequency wireless resource.

Signal processing techniques, such as beamforming and precoding, can be used to shape the signals transmitted by a number of antenna elements. Typically, by shaping the signals transmitted by the antenna elements, a base station aims to have wave-fronts collectively emitted by the antenna elements to add up constructively at the locations of intended receiver terminals, and destructively (or randomly) in other locations.

Signal processing for signals to be transmitted by a number of antenna elements is typically performed by a baseband processor. The baseband processor outputs sequences of digitally modulated symbols. These sequences are provided as input, respectively, to radio-frequency (RF) transmit chains, each transmit chain comprising a power amplifier coupled to one of the antenna elements. As the number of antenna elements grows, the signal processing performed by such a baseband processor increases in complexity.

SUMMARY

Methods and apparatuses are described for transmitting using an antenna array, where modulation is performed at least partially by a set of RF transmit chains, rather than being performed at baseband. Each beam emitted by one of the set of transmit chains represents a component of a modulated signal. The beams combine over a wireless channel to form the modulated signal. This combination of beams over a wireless channel to form a modulated signal is referred to as beam modulation. The set of transmit chains used for beam modulation is a subset of transmit chains selected from the transmit chains associated with the antenna array. In some embodiments, the subset is selected to achieve a particular transmitting objective, for example spectral efficiency, power efficiency, security, or multiple access.

In one aspect, there is provided a method for transmitting from a plurality of transmit chains. Each transmit chain includes a variable gain power amplifier coupled to an antenna element. The method involves selecting a subset of at least two transmit chains from the plurality of transmit chains, setting a gain of at least one of the variable gain power amplifiers in the subset in accordance with a modulation scheme, and transmitting a respective beam with each transmit chain in the subset. Each respective beam represents a component of a modulated signal according to the modulation scheme, so that the beams combine over a wireless channel to form the modulated signal.

Optionally, selecting the subset includes setting a size of the subset in accordance with the modulation scheme.

Optionally, selecting the subset includes selecting a proper subset from the plurality of transmit chains.

Optionally, the subset is selected based on a characteristic of an intended receiving device.

Optionally, the subset is selected in accordance with an objective including at least one of: spectral efficiency, power efficiency, security, encryption, or multiple-access.

Optionally, symbols of an input data stream for transmission are distributed among the beams from each transmit chain in the subset according to an importance metric for the symbols of the input data stream.

Optionally, beamforming processing is performed on symbols of an input data stream for transmission prior to transmitting respective beams from each transmit chain in the subset.

Optionally, the modulation scheme involves one-dimensional modulation.

Optionally, the modulation scheme involves multi-dimensional modulation.

Optionally, the multi-dimensional modulation involves orbital angular momentum (OAM) modulation.

Optionally, the modulation scheme involves at least one of Amplitude-Shift-Keying (ASK), Phase-Shift-Keying (PSK), Amplitude and Phase-Shift-Keying (APSK), or Quadrature Amplitude Modulation (QAM).

Optionally, the modulation scheme involves at least one of M-ary Amplitude-Shift-Keying (M-ASK), M-ary Phase-Shift-Keying (M-PSK), M-ary Amplitude and Phase-Shift-Keying (M-APSK), or M-ary Quadrature Amplitude Modulation (M-QAM), where M is larger than 2.

Optionally, transmitting a respective beam from each transmit chain in the subset includes transmitting a first beam and a second beam, respectively, from a first pair of antenna elements.

Optionally, transmitting a respective beam from each transmit chain in the subset further includes transmitting a third beam and a fourth beam, respectively, from a second pair of antenna elements. The variable gain power amplifiers of the transmit chains for the second pair of antenna elements are set to different gains than the variable gain power amplifiers of the transmit chains for the first pair of antenna elements.

Optionally, transmitting a respective beam from each transmit chain in the subset includes transmitting a first beam and a second beam, respectively, from a first dual-polarized antenna element.

Optionally, transmitting a respective beam from each transmit chain in the subset further comprises transmitting a third beam and a fourth beam, respectively, from a second dual-polarized antenna element. The variable gain power amplifiers of the transmit chains for the second dual-polarized antenna element are set to different gains than the variable gain power amplifiers of the transmit chains for the first dual-polarized antenna element.

In another aspect, there is provided an apparatus having a plurality of transmit chains. Each transmit chain includes a variable gain power amplifier coupled to an antenna element. The apparatus also has a processor configured to: select a subset of at least two transmit chains from the plurality of transmit chains, set a gain of at least one of the variable gain power amplifiers in the subset in accordance with a modulation scheme, and operate the subset to emit respective beams with each transmit chain in the subset. Each respective beam represents a component of a modulated signal according to the modulation scheme, so that the beams combine over a wireless channel to form the modulated signal.

Optionally, the subset is a proper subset of the plurality of transmit chains.

Optionally, a variable gain amplifier of at least one of the transmit chains in the subset operates at, or close to, saturation.

Optionally, the subset includes a first transmit chain coupled to a first antenna element and a second transmit chain coupled to a second antenna element, where the second antenna element differs from the first antenna element.

Optionally, the subset includes a first transmit chain coupled to a first port of an antenna element and a second transmit chain coupled to a second port of the antenna element. Signals supplied to the first port and the second port are emitted by the antenna element with different polarizations.

Optionally, the subset includes a first transmit chain and a second transmit chain configured in quadrature.

Optionally, the antenna elements are located in at least one of a one-dimensional array, a two-dimensional array, or a three-dimensional array.

Optionally, the antenna elements are located in a hemispherical array, and the antenna elements of the subset of transmit chains form a circular sub-array.

BRIEF DESCRIPTION OF THE DRAWINGS

Embodiments of the invention will be described in greater detail with reference to the accompanying drawings, in which.

DETAILED DESCRIPTION

Figure 1:
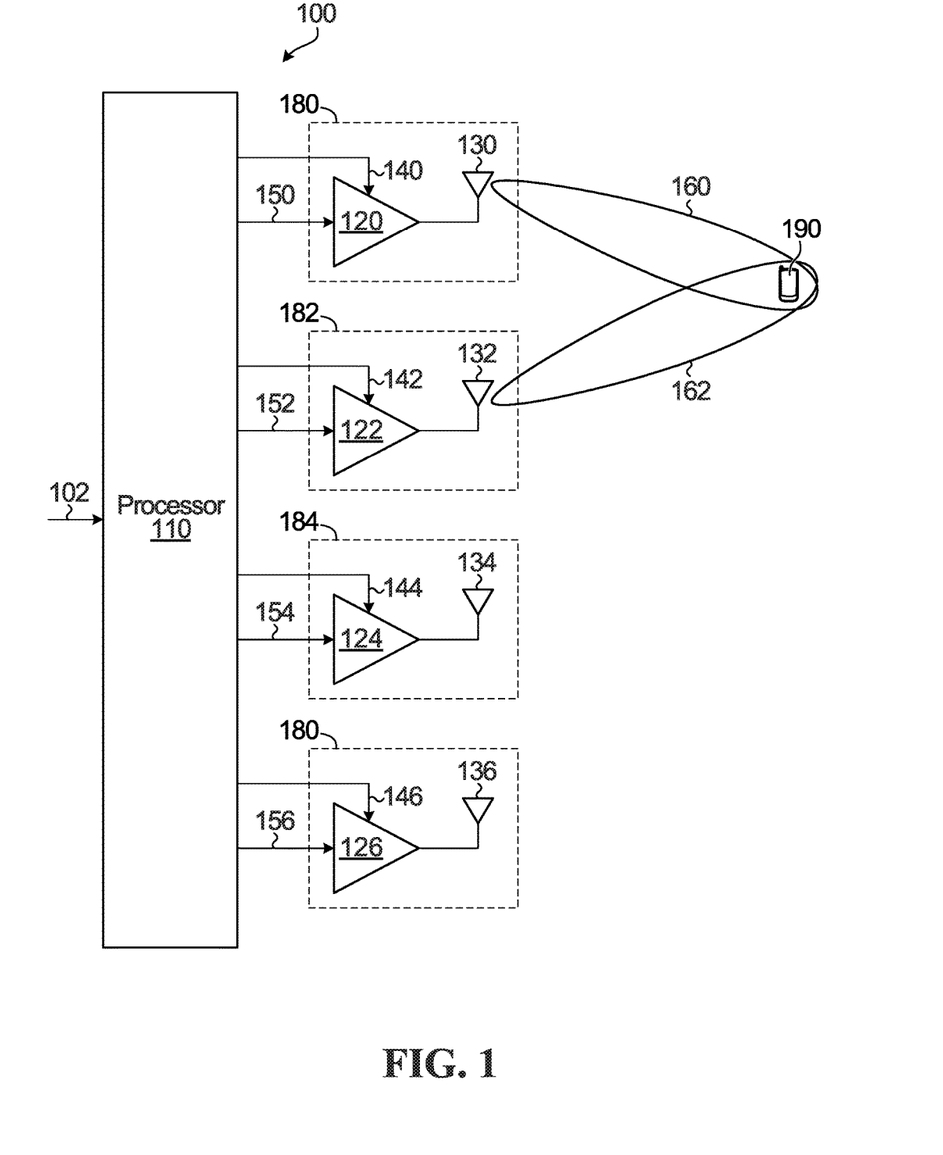
FIG. 1 is a schematic illustration of a transmitting apparatus in accordance with an embodiment of the invention.

FIG. 1 is a schematic illustration of a transmitting apparatus 100 in accordance with an embodiment of the invention, the transmitting apparatus 100 in communication with a user equipment (UE) 190. The transmitting apparatus 100 depicted may be part of a base station, a UE, or another type of network node, and may be stationary or mobile. It should be understood that in some embodiments the transmitting apparatus 100 is part of an apparatus that also includes components for receiving signals.

In the embodiment shown, the transmitting apparatus 100 has a processor 110 that receives a data stream 102 as input. Outputs 150, 152, 154, 156 from the processor 110 are provided, respectively, as inputs to RF transmit chains 180, 182, 184, 186. Each of the transmit chains 180, 182, 184, 186 has a respective variable gain power amplifier 120, 122, 124, 126 and a respective antenna element 130, 132, 134, 136. Outputs from each variable gain power amplifier 120, 122, 124, 126 drive antenna elements 130, 132, 134, 136, respectively. Control lines 140, 142, 144, 146 from processor 110 to each of the variable gain power amplifiers 120, 122, 124, 126 allow processor 110 to adjust the gains of the variable gain power amplifiers 120, 122, 124, 126.

Antenna element 130 is depicted emitting a first beam 160, and antenna element 132 is depicted emitting a second beam 162. The beams 160, 162 combine over a wireless channel to form a modulated signal for reception by the UE 190 and/or other receiving devices (not shown). It should be understood that the particular beams 160, 162 shown are intended as an illustrative example of how the transmitting apparatus 100 is communicating at a particular point in time with the UE 190. In some embodiments, other beams (not shown) are emitted from other antenna elements to communicate with other UEs. In some embodiments, the set of antenna elements emitting beams to communicate with UE 190 varies over time. In some embodiments, at particular points in time, the set of antenna elements emitting beams to communicate with UE 190 includes more than two antenna elements.

Although the embodiment shown in FIG. 1 has four transmit chains 180, 182, 184, 186, other embodiments include a different number of transmit chains, provided that the number of transmit chains is greater than or equal to two. In some embodiments, such as embodiments where the transmitting apparatus 100 is configured for massive MIMO transmitting operation, hundreds, thousands, or more transmit chains are provided.

In some embodiments, the antenna elements 130, 132, 134, 136 are part of an antenna array. Embodiments of the antenna array have a one-dimensional, two-dimensional, or three-dimensional configuration. For example, in some embodiments, the antenna array is a one-dimensional array of antenna elements distributed with regular spacing along a single axis. In some embodiments, the antenna array is a two-dimensional array of antenna elements arranged along a plane in a regularly spaced rectangular configuration. In some embodiments, the antenna array is an array of antenna elements distributed around a cylinder. In some embodiments, the antenna array is an array of antenna elements distributed in a conformal array along the surface of a hemisphere or a sphere. It should be understood that the antenna array configuration is a design choice, and that other antenna array configurations are possible.

Figure 2:
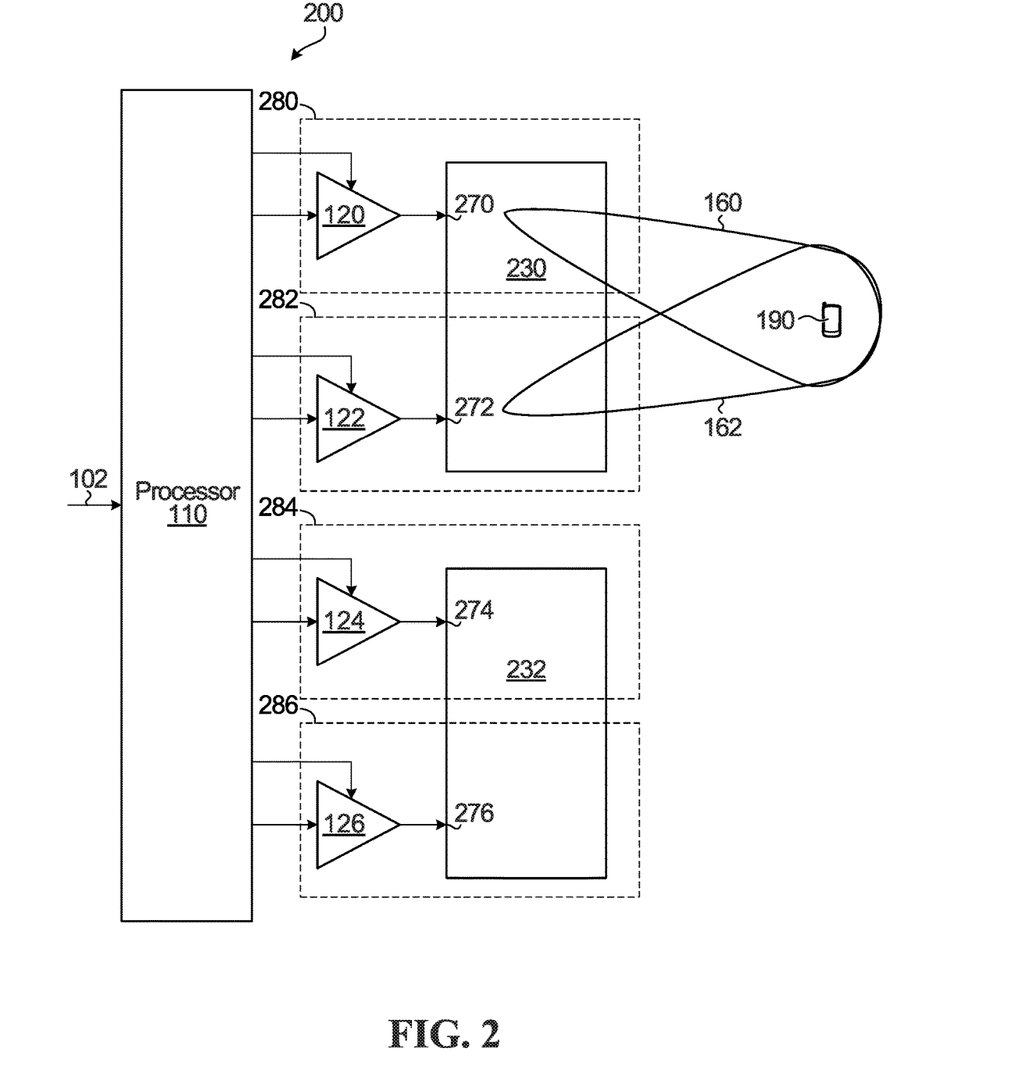
FIG. 2 is a schematic illustration of the transmitting apparatus of FIG. 1 with dual polarization antenna elements in accordance with an embodiment of the invention.

In some embodiments, the antenna elements 130, 132, 134, 136 are square in shape. In other embodiments, the antenna elements are rectangular or circular. In some embodiments, the antenna elements have a single polarization. In other embodiments, the antenna elements have dual polarization. Although antenna elements 130, 132, 134, 136 are illustrated as being separate physical antenna elements, in some embodiments antenna elements 130, 132, 134, 136 are not all physically distinct. For example, in some embodiments, each of antenna elements 130 and 132 shown in FIG. 1 are separate parts of a dual polarization antenna element, each of the parts for transmitting a signal with a different polarization. An embodiment with antenna elements having dual polarization is illustrated in FIG. 2 and will be described further below.

In some embodiments, the variable gain power amplifiers 120, 122, 124, 126 are physically located close to, or are integrated on a common substrate with, their respective antenna elements 130, 132, 134, 136. In some embodiments, proximity between the variable gain power amplifiers 120, 122, 124, 126 and their respective antenna elements 130, 132, 134, 136 improves power efficiency of the transmit chains 180, 182, 184, 186. However, it should be understood that the particular configuration of antenna elements and variable gain amplifiers is a design choice, and that other configurations are possible. In some embodiments, an apparatus for adjusting the phase of the outputs of the variable gain power amplifiers 120, 122, 124, 126 is also provided. For example, in an example embodiment, the variable gain power amplifiers 120, 122, 124, 126 are configured to have a variable phase shift, and additional control lines from processor 110 are be provided to control the respective phase shifts of each of the variable gain power amplifiers 120, 122, 124, 126. In another example embodiment, phase shifters are located in series with each of the variable gain power amplifiers 120, 122, 124, 126, and control lines from processor 110 are provided to control the phase shifts of each respective phase shifter.

In some embodiments, processor 110 is a general purpose processor under software and/or firmware control. In some embodiments, processor 110 includes a digital signal processing (DSP) unit. In other embodiments, processor 110 is a custom application-specific integrated circuit (ASIC), another type of digital processor, and/or hardware logic capable of performing beamforming, precoding, and/or equalization. Processor 110 includes logic for adjusting the gains of variable gain power amplifiers 120, 122, 124, 126 via control lines 140, 142, 144, 146, and in some embodiments includes logic for adjusting the phase shifts of each of the variable gain power amplifiers 120, 122, 124, 126. Although processor 110 is shown in FIG. 1 as being a single entity, in some embodiments its functionality is also provided by one or more cooperating processing units, for example a dedicated DSP and a general purpose processor.

In transmitting operation, processor 110 is configured to dynamically select a subset of transmit chains from the set of transmit chains 180, 182, 184, 186, the selected subset having at least two transmit chains. The selected subset of transmit chains includes a sub-array of antenna elements to use for transmission. In some cases, the selected subset is a proper subset of the set of transmit chains 180, 182, 184, 186. A proper subset of a set S is a subset of S that is not equal to S. In other cases, the selected subset consists of the entirety of the set of transmit chains 180, 182, 184, 186. In the example shown in FIG. 1, the selected subset consists of transmit chains 180, 182.

Processor 110 controls the operation of the selected subset of transmit chains 180, 182 so that beams 160, 162 are emitted from antenna elements 130, 132. Unlike conventional systems and methods for transmission where streams of modulated symbols are generated at baseband by a processor according to a modulation scheme and then subsequently amplified and transmitted as beams, in the apparatus illustrated in FIG. 1, beams 160, 162 combine over a wireless channel to form a modulated signal according to the modulation scheme.

In the apparatus of FIG. 1, processor 110 performs baseband processing of the received data stream 102 and provides streams of unmodulated or partially modulated symbols to outputs 150, 152. The unmodulated or partially modulated symbols provided to outputs 150, 152 are up-converted to radio frequency (RF) by transmit chains 180, 182. In some embodiments, processor 110 adjusts the gains of variable gain amplifiers 120, 122 to control amplitude coefficients of the streams provided as outputs 150, 152 in accordance with a modulation scheme. In some embodiments, processor 110 adjusts the phases of variable gain amplifiers 120, 122 and/or phase shifters in series with variable gain amplifiers 120, 122 to control phase coefficients of the streams provided as outputs 150, 152 in accordance with the modulation scheme. In embodiments where processor 110 adjusts the gains and/or phases of the streams provided as outputs 150, 152, modulation is at least partially performed by transmit chains 180, 182. Beams 160, 162 are respectively transmitted from transmit chains 180, 182, each respective beam representing a component of a modulated signal according to the modulation scheme, so that the beams 160, 162 combine over a wireless channel to form a modulated signal. The combination of beams over a wireless channel to form the modulated signal is referred to as beam modulation. It should be understood that, due to constructive, destructive, and random interference between beams 160, 162, the beams 160, 162 combine over the wireless channel to form the desired modulated signal in certain locations and not at other locations. In some embodiments, processor 110 performs beamforming processing at baseband so that beams 160, 162 combine over the wireless channel proximate to one or more desired locations, for example the location of user equipment 190.

In some embodiments, the modulation scheme is a one-dimensional modulation scheme, and in other embodiments, the modulation scheme is a multi-dimensional modulation scheme. In some embodiments, the modulation scheme is at least one of Amplitude-Shift-Keying (ASK), Phase-Shift-Keying (PSK), Amplitude and Phase-Shift-Keying (APSK), or Quadrature Amplitude Modulation (QAM). In other embodiments, the modulation scheme is at least one of M-ary Amplitude-Shift-Keying (M-ASK), M-ary Phase-Shift-Keying (M-PSK), M-ary Amplitude and Phase-Shift-Keying (M-APSK), or M-ary Quadrature Amplitude Modulation (M-QAM), where M is larger than 2. In some embodiments, the modulation scheme includes orbital angular momentum (OAM) modulation.

In some embodiments, processor 110 sets the number of selected transmit chains in accordance with the modulation scheme. For example, for transmission using four point quadrature amplitude modulation (4-QAM), quadrature PSK (QPSK), or offset-QPSK in some embodiments, processor 110 sets the size of the selected subset to be two, and configures first and second selected transmit chains 180, 182 in quadrature. That is, processor 110 adjusts the gain and phase of a first transmit chain 180 to transmit the real-valued components of the modulated waveform, and processor 110 adjusts the gain and phase of a second transmit chain 182 to transmit the complex-valued components of the modulated waveform. Because QPSK and offset-QPSK have a near constant power envelope, variable gain power amplifiers 120, 122 operate near saturation in some embodiments, resulting in a high level of power efficiency. In one variation, variable gain power amplifiers 120, 122 are power-efficient class C amplifiers.

In example embodiments involving transmission using a two-dimensional modulation scheme, processor 110 sets the size of the selected subset to be a multiple of two. For example, in an embodiment where the modulation scheme in use is M-ary QAM, processor 110 sets the size of the selected subset to be a multiple of two. The multiple of two is selected to make use of the principle that a given M-ary QAM waveform can be produced by combining 4-QAM constituent waveforms having different gains. Each of the 4-QAM constituent waveforms are emitted from a pair of transmit chains as described previously. Processor 110 adjusts the gains of each pair of transmit chains so that the 4-QAM constituent waveforms combine over a wireless channel to form an M-ary QAM waveform. In some embodiments, the variable gain power amplifiers in the selected subset of transmit chains have different maximum transmit power levels. In an example embodiment, processor 110 configures the transmit chains so that the variable gain amplifiers corresponding to each 4-QAM constituent waveform operate near saturation, which improves power efficiency in transmitting. In some embodiments, the size of the subset of transmit chains is selected based on a characteristic of an intended receiving device. In an example, a subset of N transmit chains is be selected to communicate with an intended receiving device having N antennas. In some embodiments, processor 110 dynamically changes the selected subset of transmit chains over time.

It should be understood that the techniques set out above for transmission using 4-QAM and M-ary QAM are intended as examples, and that similar techniques are also applicable to other modulation schemes discussed previously, such as ASK, PSK, APSK, M-ASK, M-PSK, and M-APSK.

In some embodiments, processor 110 selects the subset of transmit chains and/or distributes symbols of an input data stream for transmission amongst the beams from each transmit chain in the subset in accordance with one or more communications objectives. For example, in some embodiments, the subset of transmit chains is selected to achieve a high level of power efficiency as described above. In other embodiments, the subset of transmit chains and/or the distribution of symbols among the beams is selected for reasons relating to spectral efficiency, security, encryption, and/or multiple-access. For example, in an embodiment, processor 110 distributes symbols of an input data stream for transmission amongst the beams from each transmit chain in the subset according to an importance metric. Distributing symbols amongst the beams according to an importance metric permits selectively transmitting important bits over antenna elements capable of transmitting at a higher power level. In some embodiments, a coding scheme used by processor 110 to encode the symbols of the input data stream is chosen that takes such an importance metric into account. In some embodiments, beam-forming processing applied by processor 110 to symbols of the input data stream takes into account the manner in which the beams combine over the wireless channel to form the modulated signal. That is, the beam-forming processing is selected to work jointly with the beam modulation. In other embodiments, beam-forming processing applied by processor 110 is independent of the beam modulation. In some embodiments, spatial modulation (SM) processing applied by processor 110 acts jointly with the manner in which processor 110 selects the subset of transmit chains, for example to perform code division multiple access (CDMA) transmission, signal shaping, and/or physical-layer encryption.

A transmitting apparatus 200 that is a variation of the transmitting apparatus of FIG. 1 is illustrated in FIG. 2, the transmitting apparatus 200 having dual polarization antenna elements 230, 232. In the embodiment shown, outputs from variable gain power amplifiers 120, 122 drive first and second ports 270, 272, respectively, of a first dual polarization antenna element 230. Outputs from variable gain power amplifiers 124, 126 drive first and second ports 274, 276, respectively, of a second dual polarization antenna element 232.

Because antenna elements 230, 232 are dual polarization antenna elements, signals provided to the first ports 270, 274 of each dual polarization antenna element result in emissions having a first polarization. Signals provided to the second ports 272, 276 of each dual polarization antenna element result in emissions having a second polarization. In some embodiments, the first and second polarizations are orthogonal.

In some embodiments, each antenna element 230, 232 is formed from a pair of overlapping micro-strips (not shown). One micro-strip of each antenna element 230, 232 is coupled to first ports 270, 274, respectively, and the other micro-strip of each antenna element 230, 232 is coupled to second ports 270, 274, respectively. However, it should be understood that this configuration is an example and that other types of dual polarization antenna elements are contemplated.

In the illustrated embodiment, four transmit chains are shown: a transmit chain 280 comprising variable gain amplifier 120 and antenna element 230 driven by port 270, a transmit chain 282 comprising variable gain amplifier 122 and antenna element 230 driven by port 272, a transmit chain 284 comprising variable gain amplifier 124 and antenna element 232 driven by port 274, and a transmit chain 286 comprising variable gain amplifier 126 and antenna element 232 driven by port 276. Although the embodiment shown in FIG. 2 has four transmit chains, other embodiments include a different number of transmit chains, provided that the number of transmit chains is greater than or equal to two.

In FIG. 2, antenna element 230 is depicted emitting a first beam 160 having a first polarization and a second beam 162 having a second polarization. The beams 160, 162 combine over a wireless channel to form a modulated signal that may be received by the UE 190 and/or other receiving devices (not shown). It should be understood that the particular beams 160, 162 shown are intended as an illustrative example of how the transmitting apparatus 200 is communicating at a particular point in time with the UE 190. In some embodiments, other beams (not shown) are emitted from other antennas elements to communicate with other UEs. In some embodiments, the set of antenna elements emitting beams to communicate with UE 190 varies over time. In some embodiments, the set of antenna elements emitting beams to communicate with UE 190 include more than one dual polarization antenna element.

In transmitting operation, processor 110 shown in FIG. 2 proceeds as described above with respect to FIG. 1. That is, processor 110 selects a subset of at least two transmit chains from the available transmit chains. In the example shown in FIG. 2, processor 110 has selected a subset comprising the two transmit chains associated with dual polarization antenna element 230. Processor 110 transmits respective beams 160, 162 with each transmit chain in the subset. Each respective beam 160, 162 represents a component of a modulated signal according to a modulation scheme, so that the beams combine over a wireless channel to form the modulated signal. In some embodiments, transmitting the beams 160, 162 involves adjusting a gain of at least one of the variable gain power amplifiers 120, 122 in accordance with the modulation scheme.

In an example embodiment, processor 110 uses each dual polarization antenna element in the selected subset of transmit chains to generate a 4-QAM modulated signal by beam modulation. The beams combining over the wireless channel to form the modulated signal have different polarizations. In another example embodiment, processor 110 uses a pair of dual polarization antenna elements in the selected subset of transmit chains to generate a 16-QAM modulated signal by beam modulation. In one such embodiment, two of the four beams combining over the wireless channel to form the modulated signal are 4-QAM modulated signals having a first polarization and different gains. The other two of the four beams combining over the wireless channel to form the modulated signal are 4-QAM modulated signals having a second polarization and different gains.

Some embodiments use beam modulation to form modulated signals that employ an orbital angular momentum (OAM) modulation scheme. OAM is a property of electromagnetic waves that relates to the spatial phase profile and the spin angular momentum of the waves, rather than to the state of polarization of the waves. An OAM modulated electromagnetic wave has a helical transverse phase structure of $e^{-jm\varphi}$, where $\varphi$ is a transverse azimuthal angle and m is an OAM mode number. The OAM state mode number is an integer. OAM waves with different m values are mutually orthogonal. The orthogonality allows OAM waves with different m values to be multiplexed together along a given beam axis. OAM multiplexing enables the transmission of multiple independent data streams over a given wireless medium, which allows for increased spectral efficiency. A circular sub-array of antenna elements can be used to transmit waves having a particular OAM mode number in a radiation pattern oriented along a central axis of the circular sub-array.

Figure 3A:
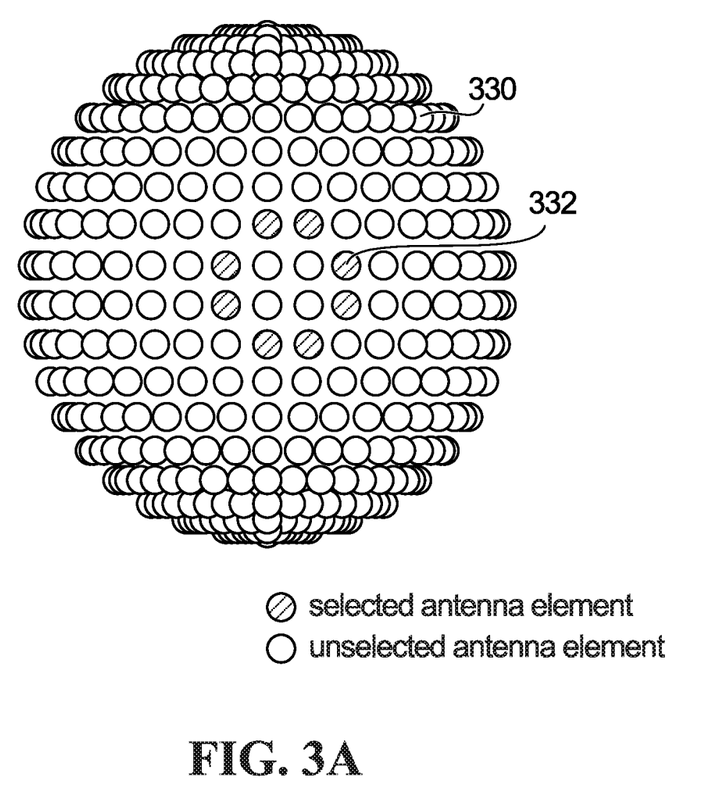
FIG. 3A is an illustration of a three-dimensional (3D) hemispherical antenna array where a subset of antenna elements having a circular configuration have been selected in accordance with an embodiment of the invention.

FIG. 3A is an illustration of a 3D hemispherical array of antenna elements 330 where a subset 332 of eight antenna elements in a circular sub-array configuration has been selected in accordance with an embodiment of the invention. In some embodiments, antenna elements 330 have a single polarization. In some embodiments, antenna elements 330 have dual polarization. Beamforming processing of signals provided to the subset 332 of eight antenna elements can cause the subset 332 of antenna elements to emit radiation having up to eight different OAM modes. It should be understood that the particular subset 332 of antenna elements is an example, and that other subsets having more or fewer antenna elements are possible. In some embodiments, the subset 332 of antenna elements is dynamically selected so that radiation emitted from the subset 332 of antenna elements is transmitted in the direction of a receiving device (not shown).

Figure 3B:
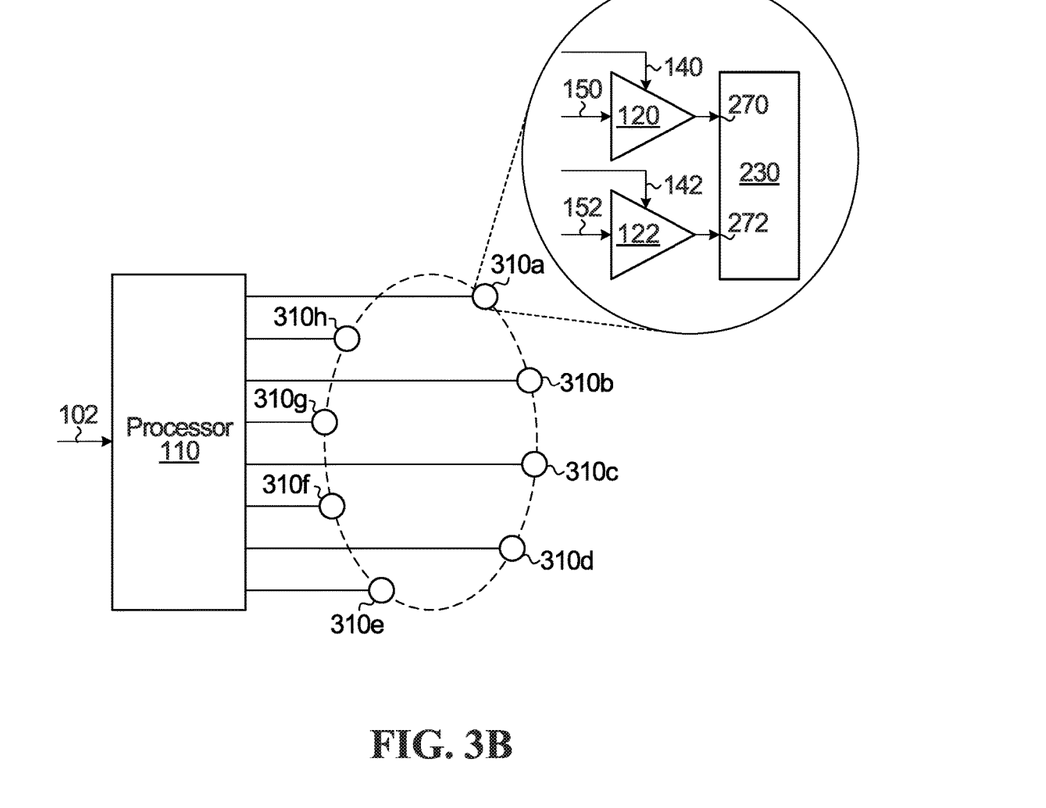
FIG. 3B is a schematic illustration of a transmitting apparatus for transmitting using the subset of antenna elements illustrated in FIG. 3A in accordance with an embodiment of the invention.

FIG. 3B is a schematic illustration of a transmitting apparatus for transmitting using the subset of antenna elements illustrated in FIG. 3A. In the embodiment shown, eight pairs of transmit chains 310a-310h are provided, each of the pairs of transmit chains including a dual polarization antenna element from the subset 332 of eight antenna elements shown in FIG. 3A. The constituent elements of transmit chain pair 310a are illustrated in detail. Like the embodiment shown in FIG. 2, a first transmit chain is depicted that receives signal input 150 from processor 110, the first transmit chain comprising variable gain amplifier 120 and antenna element 230 driven by port 270. A second transmit chain is depicted that receives signal input 152 from processor 110, the second transmit chain comprising variable gain amplifier 122 and antenna element 230 driven by port 272.

Processor 110 operates the eight pairs of transmit chains 310a-310h to emit up to sixteen beams. Each of the sixteen beams has either a first or a second polarization and one of eight OAM modes. Beams having first and second polarizations and a common OAM mode combine over the wireless channel to form a modulated signal having that common OAM mode. However, it should be understood that the particular configuration of transmit chains and antenna elements illustrated in FIG. 3B is intended as an example, and that other configurations having more or fewer transmit chains and/or single polarization antenna elements are contemplated.

Figure 4A:
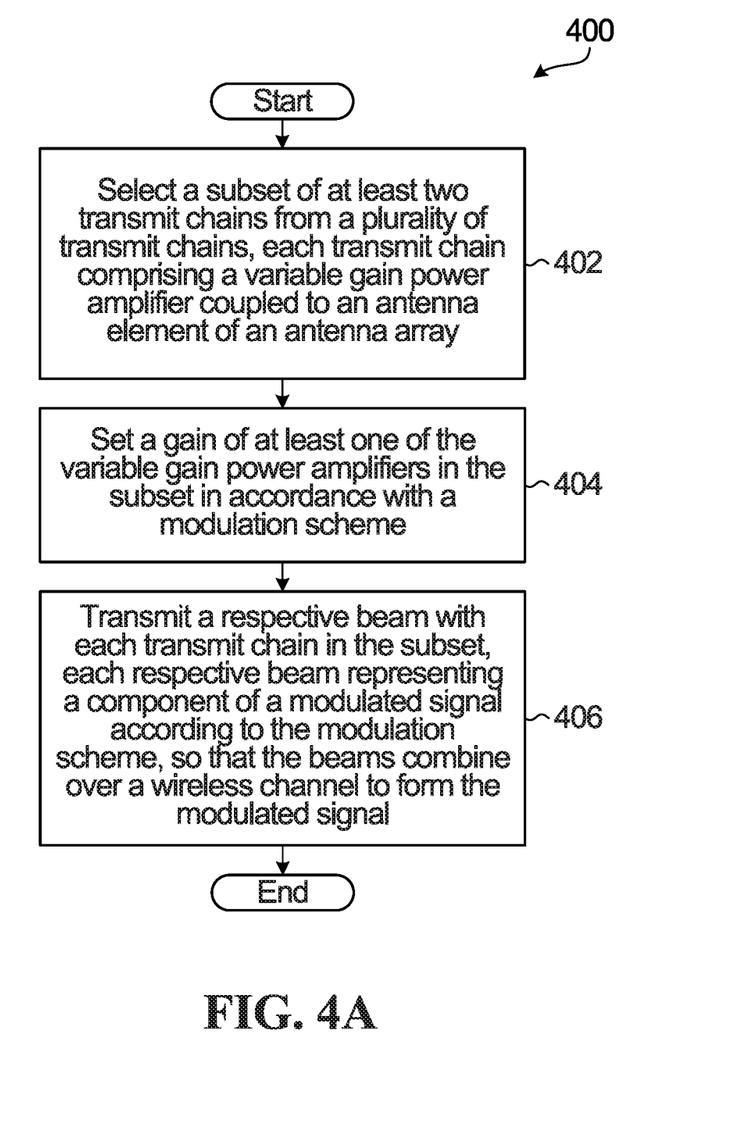
FIG. 4A is a flow diagram of a method for transmitting in accordance with an embodiment of the invention.

FIG. 4A is a flow diagram of a method for transmitting from a plurality of transmit chains in accordance with an embodiment of the invention. Each of the plurality of transmit chains includes a variable gain power amplifier coupled to a respective antenna element. At block 402, a subset of at least two transmit chains from the plurality of transmit chains is selected.

After selection of the subset, at block 404, a gain of at least one of the variable gain power amplifiers belonging to a transmit chain in the subset is set in accordance with a modulation scheme. At block 406, a beam is transmitted with each transmit chain in the subset. Each beam represents a component of a modulated signal according to a modulation scheme. The beams combine over a wireless channel to form the modulated signal. Although blocks 404 and 406 are illustrated sequentially in FIG. 4A, the steps of blocks 404 and 406 are performed simultaneously or in a different order in some embodiments.

Figure 4B:
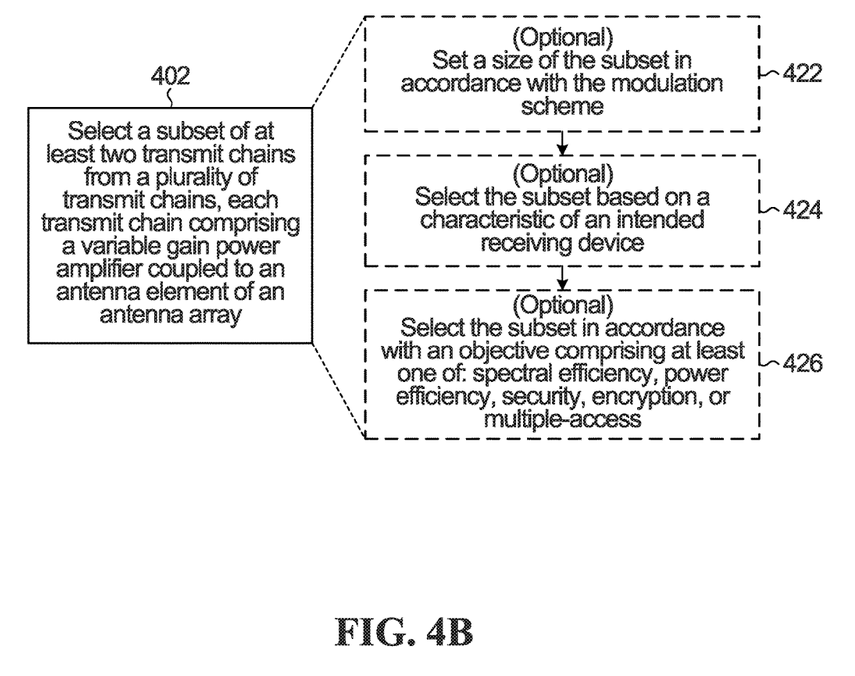
FIG. 4B is a flow diagram of optional method steps for the method of FIG. 4A in accordance with embodiments of the invention.

FIG. 4B is a flow diagram showing some optional method steps for the method illustrated in FIG. 4A. More specifically, FIG. 4B shows optional method steps that are performed in some embodiments while carrying out the steps of block 402. At block 422, a size of the subset of transmit chains that are being selected in block 402 is set in accordance with the modulation scheme. In some cases, the subset consists of a proper subset of the plurality of transmit chains. In other cases, the subset consists of all of the transmit chains of the plurality of transmit chains. At block 424, the subset of the plurality of transmit chains to use for transmission is selected based on a characteristic of an intended receiving device. At block 426, the subset of the plurality of transmit chains to use for transmission is selected in accordance with an objective comprising at least one of spectral efficiency, power efficiency, security, encryption, or multiple-access. Although blocks 422, 424, and 426 are illustrated sequentially in FIG. 4B, the steps of blocks 422, 424, and 426 are performed simultaneously or in a different order in some embodiments. Furthermore, it should be understood that the optional method steps depicted in FIG. 4B are provided as examples, and that other method steps described above are also performed before, during, or after the steps of block 402 in some embodiments.

In some embodiments, a non-transitory computer readable medium comprising instructions for execution by a processor is provided to control execution of the methods illustrated in FIGS. 4A and 4B, to implement another method described above, and/or to facilitate the implementation and/or operation of an apparatus described above. In some embodiments, the processor for executing the instructions is a component of a general-purpose computer hardware platform. In other embodiments, the processor is a component of a special-purpose hardware platform. For example, the processor is an embedded processor, and the instructions are provided as firmware. Some embodiments are implemented by using hardware only. In some embodiments, the instructions for execution by a processor are embodied in the form of a software product. The software product is stored in a non-volatile or non-transitory storage medium, which can be, for example, a compact disc read-only memory (CD-ROM), universal serial bus (USB) flash disk, or a removable hard disk.

The previous description of some embodiments is provided to enable any person skilled in the art to make or use an apparatus, method, or processor readable medium according to the present disclosure. Various modifications to these embodiments will be readily apparent to those skilled in the art, and the generic principles of the methods and devices described herein may be applied to other embodiments. Thus, the present disclosure is not intended to be limited to the embodiments shown herein but is to be accorded the widest scope consistent with the principles and novel features disclosed herein.

What is claimed is:

1. A method for transmitting from a plurality of transmit chains, each transmit chain comprising a variable gain power amplifier coupled to an antenna element, the method comprising:
    selecting a subset of at least two transmit chains from the plurality of transmit chains, wherein the subset is a proper subset of the plurality of transmit chains;
    setting a gain of at least one of the variable gain power amplifiers in the subset in accordance with a modulation scheme; and
    transmitting a respective beam with each transmit chain in the subset, each respective beam representing a component of a modulated signal according to the modulation scheme, so that the beams combine over a wireless channel to form the modulated signal, wherein
        for at least one of the beams, the component of the modulated signal is a real-valued component of the modulated signal, and
        for at least one other of the beams, the component of the modulated signal is an imaginary-valued component of the modulated signal,
        each component belonging to a respective constellation, a number of symbols in each respective constellation being different from a number of symbols in a constellation of the modulated signal.

2. The method of claim 1, wherein selecting the subset further comprises setting a size of the subset in accordance with the modulation scheme.

3. The method of claim 1, further comprising:
    selecting the subset based on a characteristic of an intended receiving device.

4. The method of claim 1, further comprising:
    selecting the subset in accordance with an objective comprising at least one of: spectral efficiency, power efficiency, security, encryption, or multiple-access.

5. The method of claim 1, further comprising:
    distributing symbols of an input data stream for transmission among the beams from each transmit chain in the subset according to an importance metric for the symbols of the input data stream.

6. The method of claim 1, further comprising:
    performing beamforming processing on symbols of an input data stream for transmission prior to transmitting respective beams from each transmit chain in the subset.

7. The method of claim 1, wherein the modulation scheme comprises multi-dimensional modulation.

8. The method of claim 7, wherein the multi-dimensional modulation comprises orbital angular momentum (OAM) modulation.

9. The method of claim 1, wherein the modulation scheme comprises at least one of Amplitude-Shift-Keying (ASK), Phase-Shift-Keying (PSK), Amplitude and Phase-Shift-Keying (APSK), or Quadrature Amplitude Modulation (QAM).

10. The method of claim 1, wherein the modulation scheme comprises at least one of M-ary Amplitude-Shift-Keying (M-ASK), M-ary Phase-Shift-Keying (M-PSK), M-ary Amplitude and Phase-Shift-Keying (M-APSK), or M-ary Quadrature Amplitude Modulation (M-QAM), where M is larger than 2.

11. The method of claim 1, wherein:
    transmitting a respective beam from each transmit chain in the subset comprises transmitting a first beam and a second beam, respectively, from a first pair of antenna elements.

12. The method of claim 11, wherein:
    transmitting a respective beam from each transmit chain in the subset further comprises transmitting a third beam and a fourth beam, respectively, from a second pair of antenna elements, and
    wherein the variable gain power amplifiers of the transmit chains for the second pair of antenna elements are set to different gains than the variable gain power amplifiers of the transmit chains for the first pair of antenna elements.

13. The method of claim 1, wherein:
    transmitting a respective beam from each transmit chain in the subset comprises transmitting a first beam and a second beam, respectively, from a first dual-polarized antenna element.

14. The method of claim 13, wherein:
    transmitting a respective beam from each transmit chain in the subset further comprises transmitting a third beam and a fourth beam, respectively, from a second dual-polarized antenna element, and
    wherein the variable gain power amplifiers of the transmit chains for the second dual-polarized antenna element are set to different gains than the variable gain power amplifiers of the transmit chains for the first dual-polarized antenna element.

15. The method of claim 1, wherein selecting a proper subset from the plurality of transmit chains comprises dynamically selecting the proper subset.

16. The method of claim 1, wherein the subset is comprised of four transmit chains and the modulation scheme is 16-QAM, wherein
    a first transmit chain transmits a respective beam representing a real-valued component of a first constituent 4-QAM waveform,
    a second transmit chain transmits a respective beam representing an imaginary-valued component of the first constituent 4-QAM waveform,
    a third transmit chain transmits a respective beam representing a real-valued component of a second constituent 4-QAM waveform having a different gain than the first constituent 4-QAM waveform, and
    a fourth transmit chain transmits a respective beam representing an imaginary-valued component of the second constituent 4-QAM waveform.

17. An apparatus comprising:
    a plurality of transmit chains, each transmit chain comprising a variable gain power amplifier coupled to an antenna element;

a processor configured to:
select a subset of at least two transmit chains from the plurality of transmit chains, wherein the subset is a proper subset of the plurality of transmit chains;
set a gain of at least one of the variable gain power amplifiers in the subset in accordance with a modulation scheme; and
operate the subset to emit respective beams with each transmit chain in the subset, each respective beam representing a component of a modulated signal according to the modulation scheme, so that the beams combine over a wireless channel to form the modulated signal, wherein
for at least one of the beams, the component of the modulated signal is a real-valued component of the modulated signal, and
for at least one other of the beams, the component of the modulated signal is an imaginary-valued component of the modulated signal,
each component belonging to a respective constellation, a number of symbols in each respective constellation being different from a number of symbols in a constellation of the modulated signal.

18. The apparatus of claim 17, wherein a variable gain amplifier of at least one of the transmit chains in the subset operates at, or close to, saturation.

19. The apparatus of claim 17, wherein:
the subset comprises a first transmit chain coupled to a first antenna element and a second transmit chain coupled to a second antenna element, the second antenna element differing from the first antenna element.

20. The apparatus of claim 17, wherein:
the subset comprises a first transmit chain coupled to a first port of an antenna element and a second transmit chain coupled to a second port of the antenna element, and signals supplied to the first port and the second port are emitted by the antenna element with different polarizations.

21. The apparatus of claim 17, wherein the subset comprises a first transmit chain and a second transmit chain configured in quadrature.

22. The apparatus of claim 17, wherein the antenna elements are located in at least one of a one-dimensional array, a two-dimensional array, or a three-dimensional array.

23. The apparatus of claim 17, wherein:
the antenna elements are located in a hemispherical array; and
the antenna elements of the subset of transmit chains form a circular sub-array.

24. The apparatus of claim 17, wherein the processor is configured to dynamically select the proper subset.

25. The apparatus of claim 17, wherein the subset is comprised of four transmit chains and the modulation scheme is 16-QAM, wherein
a first transmit chain transmits a respective beam representing a real-valued component of a first constituent 4-QAM waveform,
a second transmit chain transmits a respective beam representing an imaginary-valued component of the first constituent 4-QAM waveform,
a third transmit chain transmits a respective beam representing a real-valued component of a second constituent 4-QAM waveform having a different gain than the first constituent 4-QAM waveform, and
a fourth transmit chain transmits a respective beam representing an imaginary-valued component of the second constituent 4-QAM waveform.

* * * * *